(12) United States Patent
Jung et al.

(10) Patent No.: US 10,444,497 B2
(45) Date of Patent: Oct. 15, 2019

(54) DOOR GLASS WELCOME SYSTEM

(71) Applicants: HYUNDAI MOTOR COMPANY, Seoul (KR); KIA MOTORS CORPORATION, Seoul (KR)

(72) Inventors: Ok Tae Jung, Seoul (KR); Seung Woo Seo, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 192 days.

(21) Appl. No.: 15/610,149

(22) Filed: May 31, 2017

(65) Prior Publication Data

US 2018/0101004 A1    Apr. 12, 2018

(30) Foreign Application Priority Data

Oct. 7, 2016   (KR) .......................... 10-2016-0129839

(51) Int. Cl.
| | |
|---|---|
| *G02B 27/01* | (2006.01) |
| *B60R 25/01* | (2013.01) |
| *B60J 1/17* | (2006.01) |
| *B60R 25/20* | (2013.01) |

(52) U.S. Cl.
CPC ............... *G02B 27/01* (2013.01); *B60J 1/17* (2013.01); *B60R 25/01* (2013.01); *B60R 25/2009* (2013.01)

(58) Field of Classification Search
CPC ............ B60K 35/00; B60K 2350/2013; B60K 2350/2052; B60K 2350/357; B60K 2350/924; B60K 2350/927; B60K 2350/965; B60Q 1/24; B60R 1/1207; B60R 2001/1253; G06K 9/00791; H04N 7/183; G07C 2009/00984
See application file for complete search history.

(56) References Cited

U.S. PATENT DOCUMENTS

| | | | |
|---|---|---|---|
| 2015/0077327 A1* | 3/2015 | Pisz | B60H 1/00642 345/156 |
| 2015/0370140 A1* | 12/2015 | Bertolini | B32B 17/10036 359/275 |
| 2017/0237945 A1* | 8/2017 | Murar | B60R 1/1207 348/148 |

FOREIGN PATENT DOCUMENTS

| | | |
|---|---|---|
| JP | 2005029044 | 2/2005 |
| JP | 2008-143220 | 6/2008 |
| JP | 5236359 | 7/2013 |
| KR | 1019960017208 | 6/1996 |
| KR | 2019980030594 | 8/1998 |
| KR | 100207777 | 7/1999 |

(Continued)

*Primary Examiner* — Nelson M Rosario
(74) *Attorney, Agent, or Firm* — Lempia Summerfield Katz LLC (57) ABSTRACT

A door glass welcome system includes a door glass configured to be installed at a door of a vehicle, a glass moving portion disposed to move the door glass, a screen configured to display an image on the door glass, and a power connection blocking portion configured to supply or block power to the screen. The power connection blocking portion may include a fixing member that is disposed to move together with the door glass and that is electrically connected to the screen, a contact member that is fixed to a vehicle body to selectively contact the fixing member according to a moving position of the fixing member, and a power supply portion that supplies power to the contact member and supplies power to the screen through the fixing member.

9 Claims, 5 Drawing Sheets

(56) References Cited

FOREIGN PATENT DOCUMENTS

| KR | 20140054926 | 5/2014 |
|----|-------------|--------|
| KR | 20160068497 | 6/2016 |

* cited by examiner

DOOR GLASS WELCOME SYSTEM

CROSS-REFERENCE TO RELATED APPLICATION

This application claims priority to and the benefit of Korean Patent Application No. 10-2016-0129839 filed in the Korean Intellectual Property Office on Oct. 7, 2016, the entire contents of which are incorporated herein by reference.

BACKGROUND (a) Field of the Disclosure

The present disclosure relates to a door glass welcome system that may improve convenience for a user and salability by detecting a smart key and then displaying a welcome screen on a door glass when the smart key approaches a vehicle.

(b) Description of the Related Art

A smart key system may unlock a lock system of a vehicle without touching a smart key to the vehicle. The smart key may unlock the lock system through bi-directional communication with the vehicle, and may allow an engine to be started.

The smart key system includes an electronic control unit (ECU), a receiver, an indoor antenna, and an outdoor antenna. The ECU is combined with many functions that may be selected by a consumer.

The smart key may perform a locking or unlocking function by touching the smart key to a door handle without taking a key out. The smart key may also start an engine by pushing or turning a button without insertion of a key. In addition, the smart key may perform an anti-theft function by installing an immobilizer in which an engine may be started when a password thereof is identical to a password set in the engine. The smart key may further perform a welcome function that illuminates a front of a driver's seat by automatically turning on the light of the vehicle when a person possessing the smart key approaches the vehicle. The smart key may also perform an auto lock function that locks a door of the vehicle after a predetermined period of time when leaving the vehicle without locking the door.

Recently, research has been conducted for improving convenience for the user and salability of the vehicle by displaying a welcome screen on a door glass when the smart key approaches the vehicle. Research has also been conducted for supplying or blocking power according to ascent or descent of the door glass.

The above information disclosed in this Background section is only to enhance understanding of the background of the disclosure. Therefore, the Background section may contain information that does not form the prior art that is already known in this country to a person of ordinary skill in the art.

SUMMARY

The present disclosure is for a door glass welcome system that may improve salability of a vehicle by forming a welcome screen on a door glass. The disclosed door glass welcome system may effectively turn the welcome screen on or off by supplying power to the welcome screen in a state in which the door glass is raised and by blocking the power supplied to the welcome screen in a state in which the door glass is lowered.

An embodiment of the present disclosure provides a door glass welcome system including: a door glass configured to be installed at a door of a vehicle; a glass moving portion disposed to move the door glass; a screen configured to display an image on the door glass; and a power connection blocking portion configured to supply or block power to the screen. The power connection blocking portion may include: a fixing member that is disposed to move together with the door glass and that is electrically connected to the screen; a contact member that is fixed to a vehicle body to selectively contact the fixing member according to a moving position of the fixing member; and a power supply portion that supplies power to the contact member and supplies power to the screen through the fixing member.

The fixing member may protrude to the inside of the vehicle body from the inside of the door glass.

The door glass welcome system may further include a glass holder to which a lower portion of the door glass is fixed. The fixing member may protrude to the inside of the vehicle body from the inside of the glass holder.

When the door glass moves up to an uppermost position, the fixing member and the contact member may contact each other so that power is supplied.

A first slanted surface that approaches the door glass in a moving direction of the door glass may be formed at a cross-section of the fixing member.

A second slanted surface that corresponds to and contacts the first slanted surface may be formed at the contact member.

The power connection blocking portion may include an insertion member connected to the contact member, a housing into which the insertion member is inserted, and an elastic member that is disposed inside the housing and elastically supports the insertion member in a direction of the fixing member.

The door glass welcome system may further include a guide pin that extends from the insertion member and penetrates the housing.

The door glass welcome system may further include a smart key and a smart key detecting portion disposed to detect the smart key within a predetermined distance.

Another embodiment of the present disclosure provides a door glass welcome system including: a glass holder configured to hold a lower portion of a door glass; a glass moving portion configured to vertically move the glass holder; a screen configured to display an image on the door glass; and a power connection blocking portion configured to supply or block power to the screen. The power connection blocking portion may include: a fixing member that is disposed to be fixed to an inner surface of the glass holder and is electrically connected to the screen; a contact member that is fixed to a vehicle body to selectively contact the fixing member according to a position of the fixing member; and a power supply portion that supplies power to the contact member and supplies power to the screen through the fixing member.

When the door glass moves up to an uppermost position, the fixing member and the contact member may contact each other so that power is supplied. A first slanted surface that approaches the door glass in a moving direction of the door glass may be formed at a cross-section of the fixing member. A second slanted surface that corresponds to and contacts the first slanted surface may be formed at the contact member.

The power connection blocking portion may include an insertion member connected to the contact member, a housing into which the insertion member is inserted, and an elastic member that is disposed inside the housing and elastically supports the insertion member in a direction of the fixing member.

The door glass welcome system may further include a smart key, a smart key detecting portion disposed to detect the smart key, and a control portion configured to operate the power supply portion when the smart key is detected through the smart key detecting portion.

The screen may be formed to have a predetermined thickness at an inner surface of the door glass.

According to the present disclosure, it is possible to improve salability of a vehicle by forming a welcome screen on a door glass and to effectively turn the welcome screen on or off by supplying power to the welcome screen in a state in which the door glass is raised and by blocking power supplied to the welcome screen in a state in which the door glass is lowered.

In addition, it is possible to effectively supply or block power through sliding of a contact portion while the door glass is raised or lowered by forming a slanted surface on a portion to which the power source is supplied.

The drawings incorporate the following reference symbols, which are provided below with a brief description.
100: vehicle
110: display glass
120: smart key
130: smart key detecting portion
200: door glass
210: screen
220: wire
230: fixing member
232: first slanted surface
233: second slanted surface
235: glass holder
258: contact member
252: housing
254: insertion member
256: elastic member
260: guide pin
270: glass moving portion
280: power supply portion
400: power connection blocking portion
440: display control portion
450: vehicle control portion

DETAILED DESCRIPTION OF THE EMBODIMENTS

Hereinafter, an embodiment of the present disclosure will be described in detail with reference to the accompanying drawings.

However, the size and thickness of each component illustrated in the drawings are arbitrarily shown for ease of description. The present disclosure is not limited thereto, and the thicknesses of portions and regions in the drawings may be exaggerated for clarity.

In addition, parts that are irrelevant to the description are omitted to clearly describe the illustrative embodiments of the present disclosure. Further, like reference numerals designate like elements throughout the specification.

In the following description, identifying names of components with first, second, and the like is to differentiate the names from one another where the names of the components are the same. A specific order or arrangement of such named components is not intended.

Figure 1:
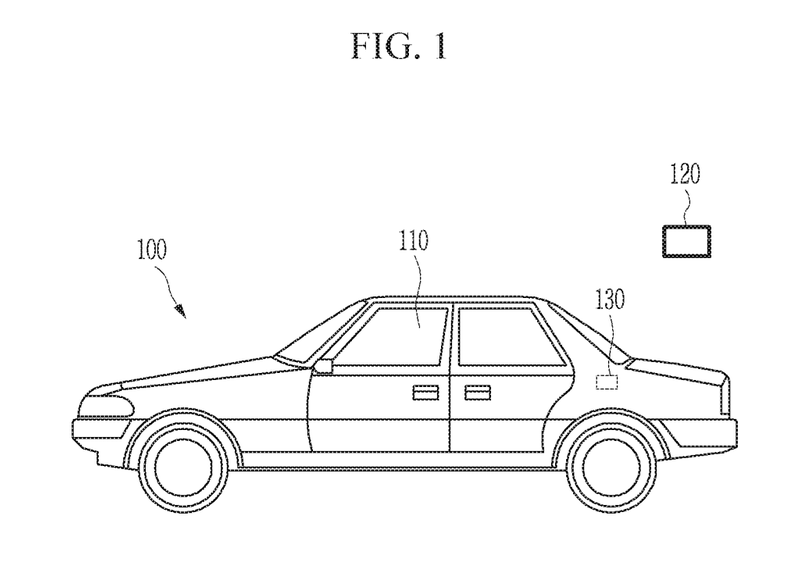
FIG. 1 illustrates a schematic diagram of a vehicle according to an embodiment of the present disclosure.

FIG. 1 illustrates a schematic diagram of a vehicle according to an embodiment of the present disclosure.

Referring to FIG. 1, a vehicle 100 includes a display glass 110, a smart key detecting portion 130, and a smart key 120. When a user having the smart key 120 approaches a body of the vehicle 100, the smart key detecting portion 130 detects the approach of the smart key 120 through an antenna or the like, and a display control portion 440 (see FIG. 4) displays an image on the display glass 110.

Figure 2:
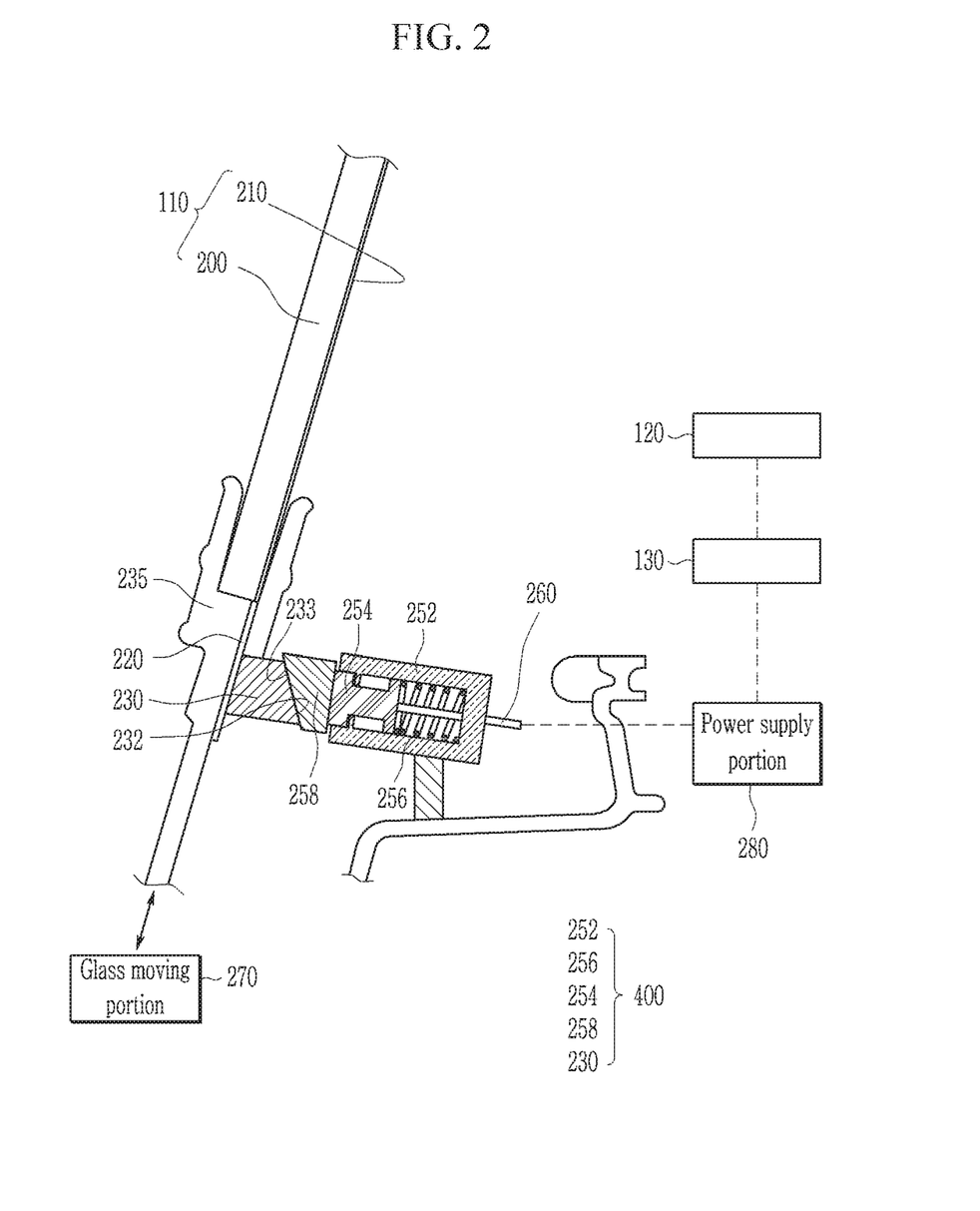
FIG. 2 illustrates a partial cross-sectional view of a state in which power is supplied in a door glass welcome system according to an embodiment of the present disclosure.

FIG. 2 illustrates a partial cross-sectional view of a state in which power is supplied in a door glass welcome system according to an embodiment of the present disclosure. FIG. 2 shows a state in which a door glass 200 and a glass holder 235 move to or are in an uppermost position.

Referring to FIG. 2, the door glass welcome system includes the smart key 120, the smart key detecting portion 130, a power supply portion 280, a power connection blocking portion 400, a glass moving portion 270, the glass holder 235, a power wire 220, the door glass 200, and a screen 210. The power connection blocking portion 400 includes a fixing member 230, a contact member 258, an insertion member 254, a housing 252, an elastic member 256, and a guide pin 260.

An upper portion of the glass holder 235 holds a lower portion of the door glass 200. The glass moving portion 270 vertically moves the glass holder 235 through a motor or the like according to operation of the user or control of the control portion.

The screen 210 is formed on an inner surface of the door glass 200 in a film form. The screen 210 receives power from the power supply portion 280 and an image signal from the display control portion 440 (see FIG. 4) to form a screen (display an image) on the door glass 200.

The fixing member 230 is fixed to an inner surface of the glass holder 235, and the power wire 220 is provided between the fixing member 230 and the screen 210. The power wire 220 transmits power, which is supplied to the fixing member 230, to the screen 210.

A first slanted surface 232 is provided on the fixing member 230 and approaches the door glass 200 in an upper or upward direction.

A second slanted surface 233 is provided on an outer end of the contact member 258 and approaches the door glass 200 in an upper or upward direction to correspond to the first slanted surface 232. A rear end of the contact member 258 is connected to the insertion member 254. The insertion member 254 is inserted into a space formed inside the housing 252.

The first slanted surface 232 of the fixing member 230 contacts the second slanted surface 233 of the contact member 258.

The elastic member 256 is disposed inside the housing 252. The elastic member 256 elastically supports the insertion member 254 in a direction in which the door glass 200 is disposed. The guide pin 260 is fixed to an end portion of the insertion member 254. The guide pin 260 penetrates a rear end portion of the housing 252 to be able to guide movement of the insertion member 254.

The power supply portion 280 is electrically connected to the elastic member 256, the housing 252, or the guide pin 260. The power supply portion 280 supplies power to the screen 210 through the contact member 258, the fixing member 230, and the power wire 220.

Thus, when power is supplied to the screen 210 and when the smart key detecting portion 130 detects the smart key 120, a display welcome function is provided to the user based on the power supply of the power supply portion 280.

Figure 3:
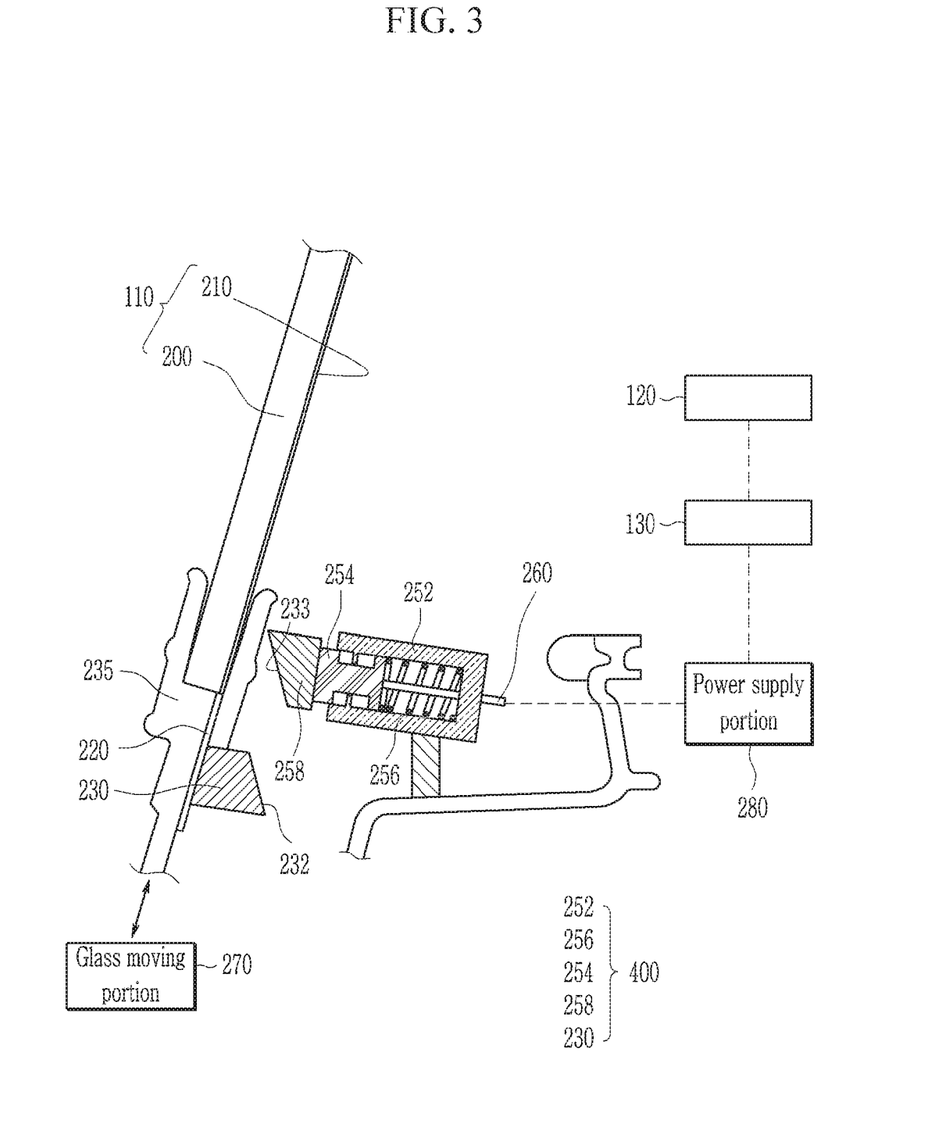
FIG. 3 illustrates a partial cross-sectional view of a state in which power is blocked in a door glass welcome system according to an embodiment of the present disclosure.

FIG. 3 illustrates a partial cross-sectional view of a state in which power is blocked in a door glass welcome system according to an embodiment of the present disclosure. FIG. 3 shows a state in which the door glass and the glass holder move by a predetermined distance from an upper raised position to a lower or lowered position.

Referring to FIG. 3, when the glass moving portion 270 moves the door glass 200, the glass holder 235, and the fixing member 230 down by a predetermined distance from an uppermost position according to operation of the user, the fixing member 230 is slid and separated from the contact member 258.

Then, since no power is supplied to the screen 210, even if the smart key detecting portion 130 detects the smart key 120, the display welcome function is not provided to the user.

Figure 4:
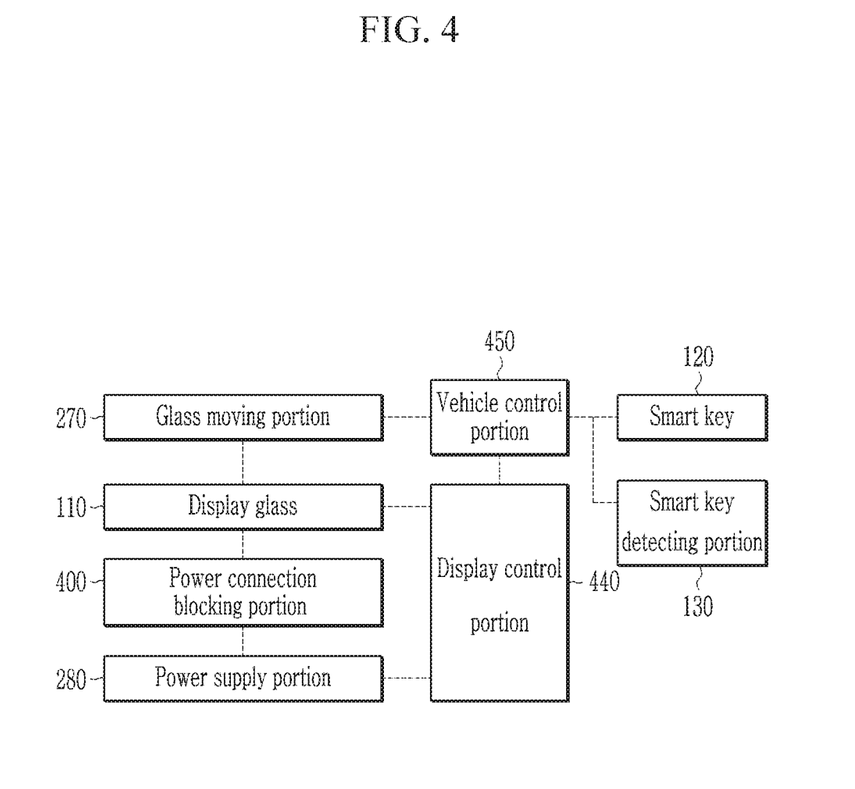
FIG. 4 illustrates a schematic diagram of a door glass welcome system according to an embodiment of the present disclosure.

FIG. 4 illustrates a schematic diagram of a door glass welcome system according to an embodiment of the present disclosure.

Referring to FIG. 4, the door glass welcome system includes the glass moving portion 270, the display glass 110, the power connection blocking portion 400, the power supply portion 280, a vehicle control portion 450, the display control portion 440, the smart key 120, and the smart key detecting portion 130. The display glass 110 includes the door glass 200 and the screen 210.

The vehicle control portion 450 and the display control portion 440 may be respectively implemented by one or more processors operated by a predetermined program. The predetermined program may include a series of commands for performing a method according to an embodiment of the present disclosure, as described further below.

The vehicle control portion 450 may detect the smart key 120 through the smart key detecting portion 130. The vehicle control portion 450 may also control the glass moving portion 270 to move the display glass 110 to the uppermost position.

When the display glass 110 moves to the uppermost position, the contact member 258 and the fixing member 230 are electrically connected. Thus, the power supply portion 280 may supply power to the display glass 110. The display control portion 440 transmits a predetermined image signal to the screen 210 of the display glass 110, thereby displaying on a predetermined screen.

The above detailed description is recited to aid in understanding of the disclosure. Unexplained portions may refer to known techniques.

In addition, although it is explained that, in the state in which the door glass 200 moves up to the uppermost position, the fixing member 230 and the contact member 258 electrically contact each other. However, the fixing member 230 and the contact member 258 may contact each other when the door glass 200 moves up to a predetermined position, which may be other than the uppermost position.

Figure 5:
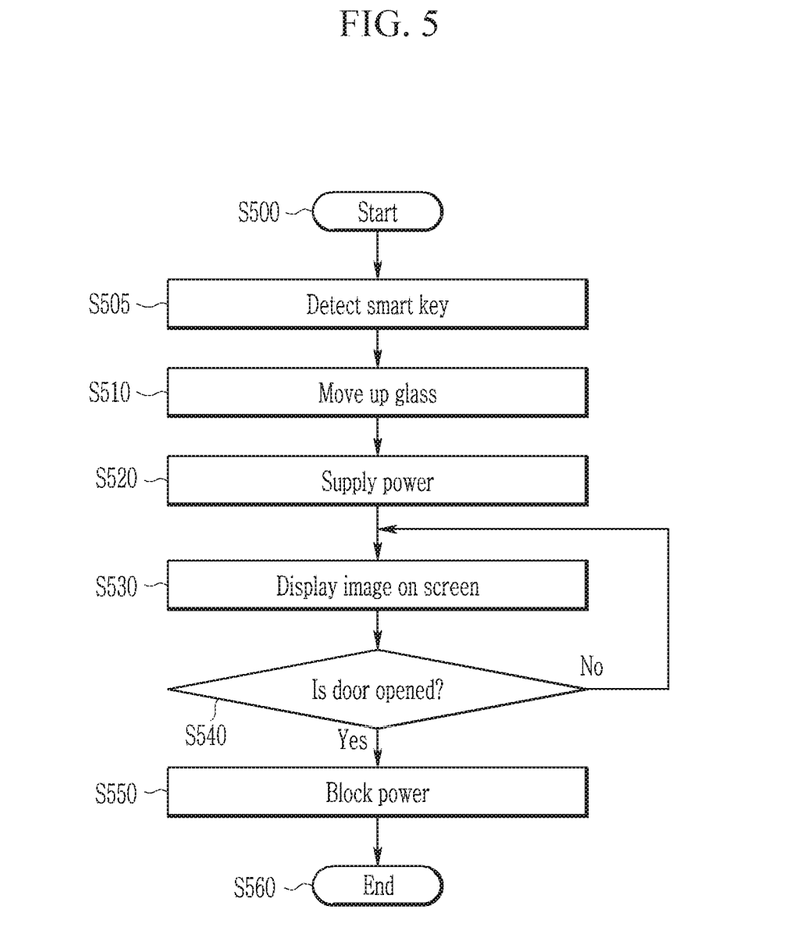
FIG. 5 illustrates a flowchart of an operational method of a door glass welcome system according to an embodiment of the present disclosure.

FIG. 5 illustrates a flowchart of an operational method of a door glass welcome system according to an embodiment of the present disclosure.

Referring to FIG. 5, in an operational method of the door glass welcome system, a control operation starts at step S500. The smart key detecting portion 130 detects the smart key 120 at step S505.

At step S510, the vehicle control portion 450 controls the glass moving portion 270 to move the door glass 200 to the uppermost position or to a predetermined position.

The power supply portion 280 supplies power to the screen 210 through an electrical connection between the contact member 258 and the fixing member 230 at step S520. The display control portion 440 transmits an image signal to the screen 210 to display a predetermined image on the screen 210 at step S530.

It is determined whether a vehicle door provided with the door glass 200 is opened by the user at step S540. When the vehicle door is determined to be opened, the power supplied to the door glass 200 is blocked at step S550. When the vehicle door is determined to not be opened but instead to be closed, step S530 is performed.

While this disclosure has been described in connection with what are presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A door glass welcome system comprising:
   a door glass configured to be installed at a door of a vehicle;
   a glass moving portion disposed to move the door glass;
   a screen configured to display an image on the door glass; and
   a power connection blocking portion configured to supply or block power to the screen,
   wherein the power connection blocking portion includes
      a fixing member that is disposed to move together with the door glass and is electrically connected to the screen,
      a contact member that is fixed to a vehicle body to selectively contact the fixing member according to a moving position of the fixing member, and
      a power supply portion that supplies power to the contact member and supplies power to the screen through the fixing member,
   wherein, when the door glass moves up to an uppermost position, the fixing member and the contact member contact each other so that power is supplied,
   wherein a first slanted surface that approaches the door glass in a moving direction of the door glass is formed at a cross-section of the fixing member, and
   wherein the power connection blocking portion includes an insertion member connected to the contact member,
      a housing into which the insertion member is inserted, and
      an elastic member that is disposed inside the housing and elastically supports the insertion member in a direction of the fixing member.

2. The door glass welcome system of claim 1, wherein the fixing member protrudes to the inside of the vehicle body from the inside of the door glass.

3. The door glass welcome system of claim 1, further comprising:

a glass holder to which a lower portion of the door glass is fixed, wherein the fixing member protrudes to the inside of the vehicle body from the inside of the glass holder.

4. The door glass welcome system of claim 1, wherein a second slanted surface that corresponds to and contacts the first slanted surface is formed at the contact member.

5. The door glass welcome system of claim 1, further comprising:
   a guide pin that extends from the insertion member and penetrates the housing.

6. The door glass welcome system of claim 1, further comprising:
   a smart key; and
   a smart key detecting portion disposed to detect the smart key within a predetermined distance.

7. A door glass welcome system comprising:
   a glass holder configured to hold a lower portion of a door glass;
   a glass moving portion configured to vertically move the glass holder;
   a screen configured to display an image on the door glass; and
   a power connection blocking portion configured to supply or block power to the screen,
   wherein the power connection blocking portion includes
      a fixing member that is disposed to be fixed to an inner surface of the glass holder and is electrically connected to the screen,
      a contact member that is fixed to a vehicle body to selectively contact the fixing member according to a position of the fixing member, and
      a power supply portion that supplies power to the contact member and supplies power to the screen through the fixing member,
   wherein, when the door glass moves up to an uppermost position, the fixing member and the contact member contact each other so that power is supplied,
   wherein the door glass system further comprises
      a first slanted surface that approaches the door glass in a moving direction of the door glass and that is formed at a cross-section of the fixing member; and
      a second slanted surface that corresponds to and contacts the first slanted surface and that is formed at the contact member, and
   wherein the power connection blocking portion includes
      an insertion member connected to the contact member,
      a housing into which the insertion member is inserted, and
      an elastic member that is disposed inside the housing and elastically supports the insertion member in a direction of the fixing member.

8. The door glass welcome system of claim 7, further comprising:
   a smart key;
   a smart key detecting portion disposed to detect the smart key; and
   a control portion configured to operate the power supply portion when the smart key is detected through the smart key detecting portion.

9. The door glass welcome system of claim 7, wherein the screen is formed to have a predetermined thickness at an inner surface of the door glass.

* * * * *